2 Sheets—Sheet 1.

J. ORR,

Assignor to ORR, PAINTER & Co.

Heating-Stove.

No. 8,538. Reissued Jan. 7, 1879.

WITNESSES

Frank. P. Kinsey

Walter. P. Kinsey

INVENTOR

Jesse Orr per Thomas. P. Kinsey Atty

N. PETERS, PHOTO-LITHOGRAPHER, WASHINGTON, D. C.

2 Sheets—Sheet 2.

J. ORR,

Assignor to ORR, PAINTER & Co.

Heating-Stove.

No. 8,538. Reissued Jan. 7, 1879.

WITNESSES
Frank. P. Kinsey
Walter. P. Kinsey

INVENTOR
Jesse Orr
per Thomas P. Kinsey Atty

N. PETERS, PHOTO-LITHOGRAPHER, WASHINGTON, D. C.

UNITED STATES PATENT OFFICE.

JESSE ORR, OF READING, PA., ASSIGNOR TO ORR, PAINTER & CO.

IMPROVEMENT IN HEATING-STOVES.

Specification forming part of Letters Patent No. 131,774, dated October 1, 1872; Reissue No. 8,538, dated January 7, 1879; application filed December 6, 1878.

*To all whom it may concern:*

Be it known that I, JESSE ORR, of Reading, in the county of Berks, State of Pennsylvania, have invented certain Improvements in Stove-Heaters, of which the following is a specification:

The invention relates to that class of heaters which are used for heating both a lower and upper room; and consists in constructing a section, A, of the heater, connected with the top of the fire-chamber B, with double walls C D, the annular space between which forms a passage for the heated air. The walls are pierced at intervals radially for the introduction of doors E, glazed with mica. Where so pierced, the walls C D are joined together by a web, G, thus permitting the air to circulate around the openings F. The base-ring H of the section A rests upon the fire-chamber B, and has openings J provided for the admission of air, said openings being outside of the fire-chamber, and leading into the annular space between the walls C and D, and surrounding the openings F. The cover-plate K of section A is also provided with holes L directly over and connected with the annular space beneath, through which the air, heated by contact with the inner wall, D, rises into the chamber above the section A, and from thence is conducted, in the usual way, to the room above.

Figure 1:
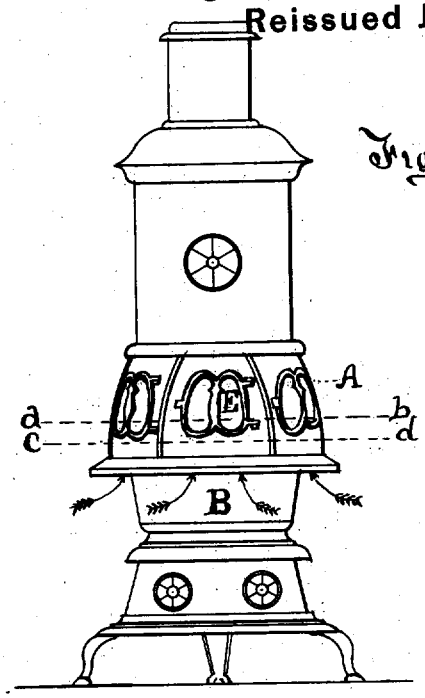
Figure 2:
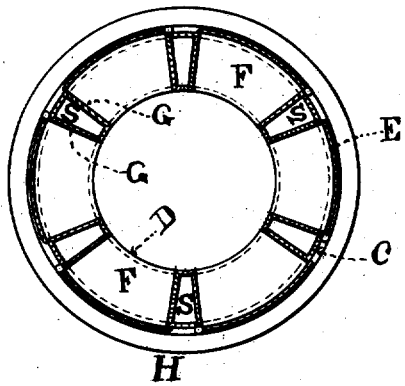
Figure 3:
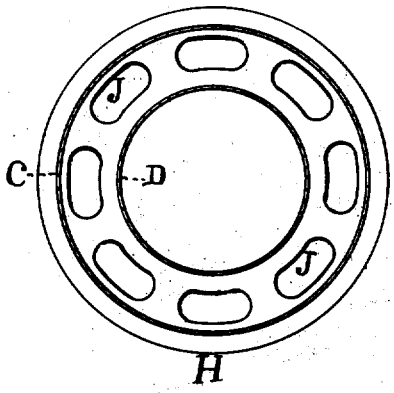
Figure 4:
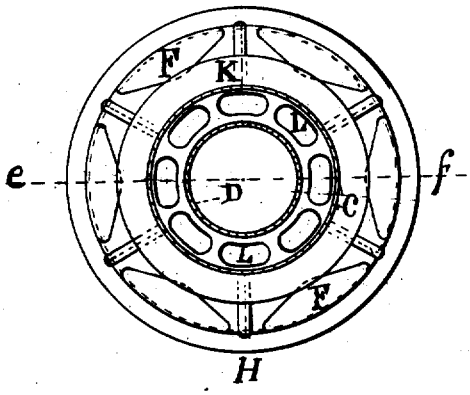
Figure 6:
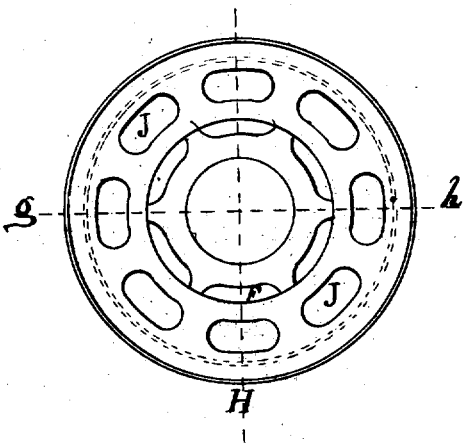
Figure 5:
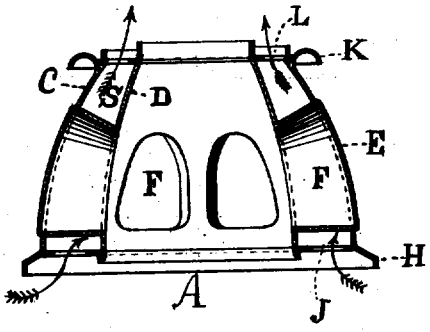
Figure 7:
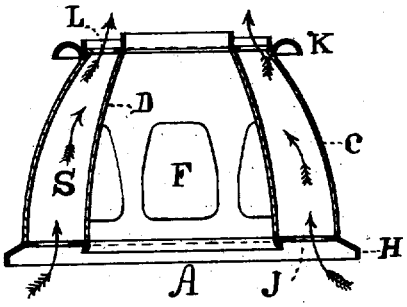

Figure 1, Sheet 1, is a front elevation of the improved stove-heater. Fig. 2, Sheet 1, is a sectional plan on the line *a b* of Fig. 1. Fig. 3, Sheet 1, is a sectional plan on the line *c d* of Fig. 1. Fig. 4, Sheet 2, is a top plan of section A. Fig. 6, Sheet 2, is a reverse plan of section A. Fig. 5, Sheet 2, is a vertical section on the line *e f* of Fig. 1. Fig. 7, Sheet 2, is a vertical section on the line *g h* of Fig. 6.

Like letters in all the figures indicate the same parts.

The inner wall, D, being convergent over the fire-chamber B, becomes thoroughly heated by the direct action of the flame, which rarefying the air between the walls C and D, it rises into the upper section of the heater, its place being supplied and a constant circulation of the air in the annular space kept up from the apartment in which the stove-heater is placed, thus furnishing a regular heat to the room above, while the lower room is being heated, in the usual manner, by radiation from the exterior of the fire-chamber B, and through the mica doors E, covering the passages F, provided for that purpose, through the walls C and D.

I claim as my invention—

1. The section A, having double walls C and D, forming the annular space S, with the plates H and K, having openings J and L, respectively, the said section A being arranged and operating, in relation to the fire-chamber and the upper part of the heater, substantially in the manner and for the purpose set forth.

2. In combination with the walls C and D, the radial spaces or openings F, provided with mica doors for the transmission of heat from the interior of the section A, as and for the purpose specified.

JESSE ORR.

Witnesses:
JAMES R. KENNEY,
J. H. JACOBS.